United States Patent [19]

Kuzuya et al.

[11] 4,445,449

[45] May 1, 1984

[54] STITCH PATTERN SETTING APPARATUS FOR ELECTRICALLY DRIVEN SEWING MACHINE

[75] Inventors: Kaneharu Kuzuya, Anjo; Giichi Ishida; Kosho Ishizaki, both of Hitachi, all of Japan

[73] Assignees: Hitachi, Ltd.; Aisin Seiki Co., Ltd., both of Tokyo, Japan

[21] Appl. No.: 379,916

[22] Filed: May 19, 1982

[30] Foreign Application Priority Data

May 20, 1981 [JP] Japan ............................. 56-74869

[51] Int. Cl.³ .................... D05B 19/00; D05B 3/02
[52] U.S. Cl. ............................ 112/121.11; 112/158 E
[58] Field of Search ................ 112/121.11, 121.12, 112/158 E, 275, 277, 317

[56] References Cited

U.S. PATENT DOCUMENTS 4,122,786 10/1978 Tanimoto et al. ............. 112/158 E
4,195,582 4/1980 Novick et al. ................. 112/121.11
4,373,459 2/1983 Dunn et al. ..................... 112/158 E

OTHER PUBLICATIONS

Juki, "Electro-Stop Motor," Sep., 1980, Juki Industrial Co., 23-3, Kabuki-Cho 1-Chome, Shinjuku-Ku, Tokyo, 160, Japan.

Primary Examiner—Peter P. Nerbun
Attorney, Agent, or Firm—Antonelli, Terry & Wands

[57] ABSTRACT

A stitch pattern setting apparatus for an electrically driven sewing machine comprises at least two pattern setting units each including stitch pattern selecting arrangements for selecting a desired one of a plurality of different stitch patterns and pattern setting arrangements for setting the numbers of stitches, respectively, for pattern elements constituting the selected stitch pattern. Each of the pattern setting unit is capable of selecting the stitch pattern and setting the stitch numbers independent of the other pattern setting unit.

2 Claims, 5 Drawing Figures

STITCH PATTERN SETTING APPARATUS FOR ELECTRICALLY DRIVEN SEWING MACHINE

BACKGROUND OF THE INVENTION

The present invention relates generally to a stitch pattern setting apparatus for an electrically driven sewing machine and, now particularly to an improvement of the stitch pattern setting apparatus of a type in which various sewing or stitch patterns can be alternately and mutually exchanged for use.

Generally, as shown in FIG. 1, a motor-driven sewing machine of the aforementioned to type is arranged such that a rotation shaft of the sewing machine MC is driven by a clutch motor MO, with a clutch disc CLB being disposed between a friction clutch disc CLM, fixedly mounted on an output shaft of the clutch motor MO and a friction brake disc BRM. When a clutch coil CL is electrically energized, the clutch disc CLB is brought into contact with the friction clutch disc CLM. On the other hand, when a brake coil BR is electrically energized, the clutch disc CLB is brought into contact with the friction brake disc BRM. The rotation shaft of the sewing machine MC has a pulley PL1 fixedly mounted at one end portion thereof, which pulley PL1 is operatively coupled to a pulley PL2 by means of a belt BL. The pulley PL2 is mounted on one end portion of a shaft, with the clutch disc CLB being fixedly mounted at the other end portion of the shaft. A synchronizer SY is mounted on and end of the rotation shaft of the sewing machine MC synchronizer SY serving to detect the number of rotation of the machine shaft as well as vertical positions (up and down positions) of a needle. The motor MO is provided with a controller CTR to which a pedal sensor PS is connected for detecting actuated positions of a foot pedal FP. The controller CTR has inputs supplied with signals representative of a stitch pattern and the number of stitches, respectively, which signals are produced by a stitch pattern setting apparatus PAT mounted on the lower surface of a machine table TB. As shown in FIG. 2 the controller CTR includes a microcomputer MCPU which receives as inputs thereto the pattern signal and the stitch number signal from the pattern setting apparatus PAT, a machine speed signal TG, the upper needle position signal UP and the lower needle position signal DOWN from the synchronizer TG, a forward switch signal FSW and a reverse switch signal RSW from the pedal sensor PS, and a speed set signal SSET. Based on the results of the processing of these input signals, the micro-computer MCPU controls the clutch coil CL through a transistor TCL, the brake coil BR through a transistor TBR and a stitch pattern repeating solenoid RV through an associated transistor TRV, whereby the sewing machine MC is so driven as to form the stitch pattern having a predetermined number of stitches sequentially and repeatedly set at the pattern setting apparatus PAT. Since the machine driving system of this type is well known in the art, any further description is considered unnecessary.

As shown in FIG. 3, the known pattern setting apparatus PAT includes a rotary switch RSW1 for selecting a desired stitch pattern and a digital setting switch RSW2 for setting the number of stitches for respective pattern elements constituting the selected stitch pattern. The digital setting switch RSW2 includes decimal one-digit counters or switches 11, 12, 13, 14, 15 and 16, each capable of independently setting any desired number of 0 to 9. The rotary switch RSW1 is arranged to select one of three stitch patterns 1, 2 and 3 and the respective numbers of stitches for the pattern elements A, B, C and D, are set to any number of 0 to 9 by one-digit switches 11, 12, 13 and 14, respectively, while the numbers of stitches for the pattern elements E, F and G are set to any number of 0 to 99 by pairs of one-digit switches 11, 12; 13, 14 and 15, 16, respectively. In the case of the illustrated example, since the numbers of stitches for the pattern elements A, B, C, D and G are set at 4, 4, 4, 4 and 44, respectively, a complete stitch pattern 1 is formed through operation of the sewing machine MC in succession of the element A (4 stitches in the forward sewing direction), the element B (4 stitches in the reverse sewing direction), the element G (44 stitches in the forward direction), the element C (4 stitches in the reverse direction) and the element D (4 stitches in the forward direction) in this sequence. When the foot pedal is continuously pressed, the sewing operation is continued so that the stitch pattern 1 is repeatedly formed.

When a sewing operation is to be carried out by a single sewing machine in such a manner in which a set of different stitch patterns having different numbers of stitches are formed repeatedly, the corresponding change-over of the rotary switch RSW1 as well as the alteration of the values set by the digital switches has to be done every time the stitch pattern is to be changed which means that a correspondingly increased number of switch manipulations are required, involving less operation efficiency. Further, there may arise the possibility of erroneous operation such as erroneous setting of the stitch number.

SUMMARY OF THE INVENTION

An object of the present invention is to provide a sewing pattern setting apparatus for an electrically driven sewing machine which apparatus is adapted to form a set of different stitch patterns repeatedly with an enhanced efficiency, while substantially excluding the possibility of the stitch number being erroneously set.

In view of the above object, it is proposed according to the present invention that a plurality of different stitch patterns as well as the stitch numbers for the constituent element patterns are independently set so that the stitch pattern signal and the stitch number signal as required can be obtained merely by selecting a desired stitch pattern by means of a pattern change-over switch in the course of sewing operation to thereby enhance the operation efficiency and prevent the erroneous setting of the stitch number.

BRIEF DESCRIPTION OF THE DRAWINGS

FIG. 1 shows a general arrangement of an electrically driven sewing machine to which the present invention may be applied;

FIG. 2 shows in a block diagram a controller employed in the electrically driven sewing machine shown in FIG. 1;

DESCRIPTION OF THE PREFERRED EMBODIMENTS

Figure 3:
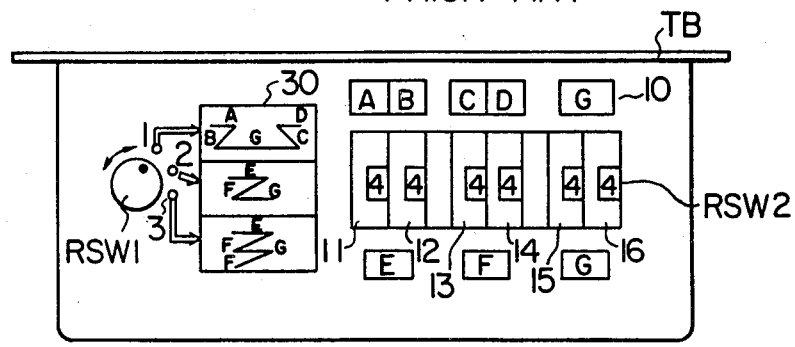
FIG. 3 shows an external appearance of a known stitch pattern setting apparatus.
Figure 4:
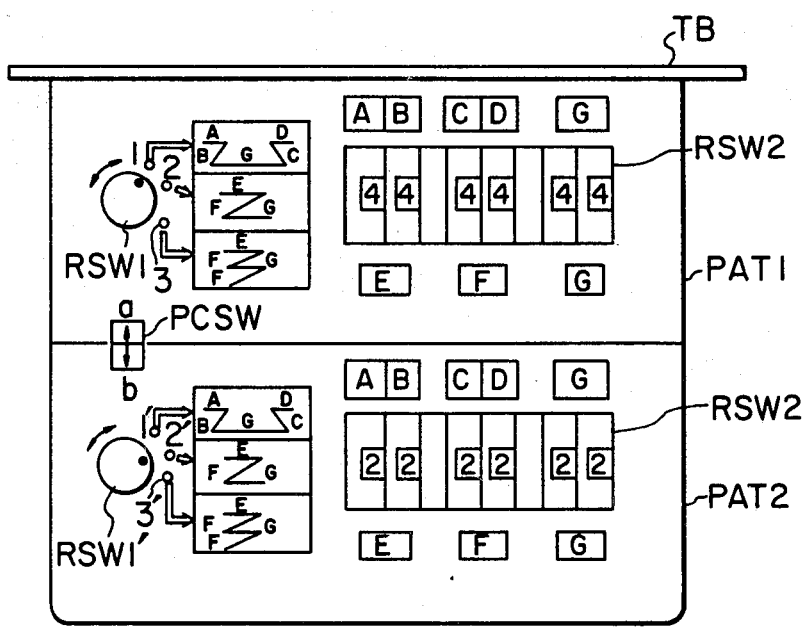
FIG. 4 shows an external appearance of a stitch pattern setting apparatus according to an exemplary embodiment of the present invention.

Referring to FIG. 4 a stitch pattern setting apparatus of the invention includes a pair of stitch pattern setting units PAT1 and PAT2 of the type described hereinafore in connection with FIG. 3 are disposed in juxtaposition, with information of the stitch pattern and the stitch numbers produced from a given one of the stitch pattern units PAT1 and PAT2 being inputted to a microcomputer MCPU by means of a pattern change-over switch PCSW.

Figure 5:
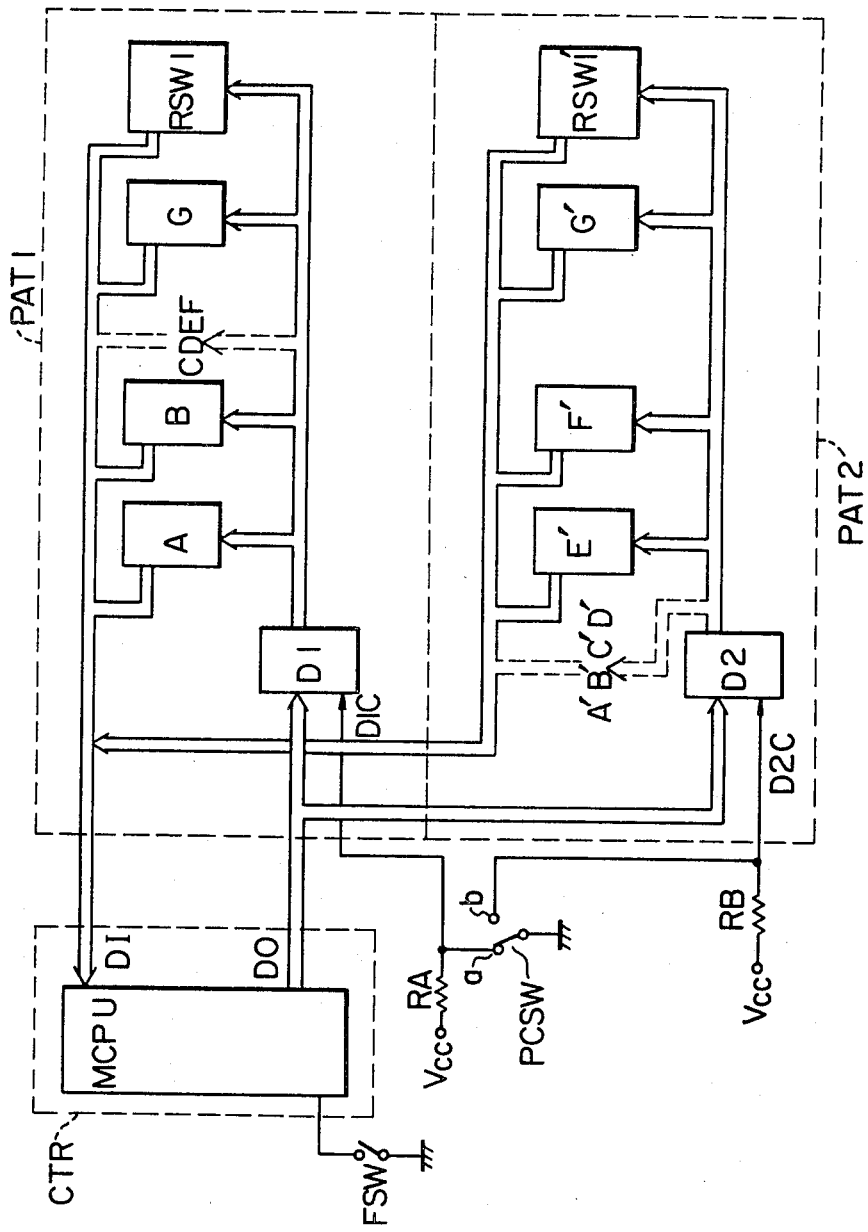
FIG. 5 shows in a block diagram connections between the stitch pattern setting apparatus and a microcomputer.

Referring to FIG. 5 which shows in a block diagram interconnections between the micro-computer MCPU and the stitch pattern setting units PAT1 and PAT2, a command signal D0, for reading out information about the set stitch pattern as issued by the micro-computer MCPU, is applied to the inputs of decoders D1 and D2 in parallel. When the decoder D1 is enabled, the stitch number information A, B, C, D, E, F and/or G set by the digital setting switch RSW2 and the stitch pattern information set by the rotary selector switch RSW1 of the stitch pattern setting unit PAT1 are loaded in the micro-computer MCPU as the information signal D1. On the other hand, when the decoder D2 is enabled, the stitch number information A', B', C', D', E', F' and/or G' set at the digital setting switch RSW2' and the stitch pattern information selected by the rotary selector switch RSW1' of the stitch pattern setting unit PAT2 are loaded in the micro-computer MCPU. The pattern change-over switch PCSW has a common terminal connected to the ground potential, a contact a connected directly to the input of the decoder D1 and to a power supply source VCC by way of a resistor RA, and a contact b which is connected directly to the input of the decoder D2 and to the power supply source VCC by way of a resistor RB.

When the ground potential is applied to the contact a of the pattern change-over switch PCSW, a control signal D1C for the decoder D1 becomes logic "0", whereby the decoder D1 is enabled or validated. From the moment when the forward switch FSW is closed, the command signal DO for reading out the set pattern information is periodically outputted from the microcomputer at a predetermined time interval (e.g. every 50 μsec.). The signal DO is decoded by the decoder D1, whereupon information of the stitch pattern selected by the rotary selector switch RSW1 and information of the stitch numbers A, B, C, . . . , G set by the digital switch RSW2 of the selected stitch pattern setting unit PAT1 are successively read out and stored in the micro-computer MCPU, which then processes these information signals and causes the sewing operation to be carried out in accordance with the stitch pattern set at the stitch pattern setting unit PAT1 by correspondingly controlling the transistors TCL, TBR and TRV in the manner similar to the known apparatus described.

When the contact b of the pattern change-over switch PCSW is connected to the ground potential, a control signal D2C for the decoder D2 becomes logic "0" to thereby enable or validate the decoder D2. In this case, the information of the stitch pattern and the stitch numbers set at the stitch pattern setting unit PAT2 is loaded in the microcomputer MCPU, resulting in a that the sewing operation being carried out in accordance with the stitch pattern set at the stitch pattern setting unit PAT2.

In this way, by presetting the first stitch pattern and stitch numbers of pattern elements for the first stitch pattern at the first stitch pattern setting apparatus PAT1 while the second stitch pattern and stitch numbers thereof are preset at the second stitch pattern apparatus PAT2, it is possible to selectively carry out two types of stitching processes through a simple change-over switch PCSW in the course of the sewing operation. Further, because the rotary switches RSW1 and RSW1' and the digital switches RSW2 and RSW2' are set in prior to the stitching operation, the danger of the erroneous settings can be eliminated. It is also possible to increase the number and the variety of the stitch patterns to be selected in the single sewing machine, by to another advantage, merely increasing the number of the pattern setting units of the same structure provided in parallel as described above.

As will be appreciated from the foregoing, the invention makes it possible to selectively perform a plurality of stitching processes merely by correspondingly operating the pattern change-over switch with the possibility of erroneous setting being substantially reduced by virtue of the inventive arrangement in which the plurality of the stitch patterns and the stitch numbers therefor are independently set in a corresponding number of the stitch pattern setting units.

We claim:

1. An electrically driven sewing machine provided with means for selecting one of a plurality of stitch patterns and setting the numbers of stitches for respective pattern elements constituting the selected stitch pattern, wherein said means includes a plurality of stitch pattern setting units, each of said stitch pattern setting units including means for selecting the stitch pattern and means for setting the numbers of stitches included, respectively, in the pattern elements constituting said selected stitch pattern, independent of the other pattern setting units and means for selectively switching between the pattern units during a sewing operation by the sewing machine so as to enable a change in the sewing patterns.

2. An electrically driven sewing machine according to claim 1 wherein each of said stitch pattern setting units includes a rotary switch for selecting one of at least two different stitch patterns and digital switches for setting the numbers of the stitches respectively for the pattern elements constituting said selected stitch pattern.

* * * * *